US007040621B2

(12) United States Patent
Cheng

(10) Patent No.: US 7,040,621 B2
(45) Date of Patent: *May 9, 2006

(54) INTELLECTUAL BUILDING BASE PLATE ASSEMBLING GAME DEVICE

(76) Inventor: Ming-Hsien Cheng, 235 Chung-Ho Box 8-24, Taipei (TW)

( * ) Notice: Subject to any disclaimer, the term of this patent is extended or adjusted under 35 U.S.C. 154(b) by 69 days.

This patent is subject to a terminal disclaimer.

(21) Appl. No.: 10/645,938

(22) Filed: Aug. 25, 2003

(65) Prior Publication Data

US 2004/0063080 A1 Apr. 1, 2004

Related U.S. Application Data

(63) Continuation-in-part of application No. 10/108,490, filed on Mar. 29, 2002, now Pat. No. 6,702,285.

(51) Int. Cl.
*A63F 9/12* (2006.01)

(52) U.S. Cl. .................... 273/160; 273/157 R; 273/241

(58) Field of Classification Search ................ 273/241, 273/276, 290, 160, 157 R, 156, 271
See application file for complete search history.

(56) References Cited

U.S. PATENT DOCUMENTS

| | | | | | |
|---|---|---|---|---|---|
| 3,065,970 | A | * | 11/1962 | Sutton | 273/160 |
| 4,133,538 | A | * | 1/1979 | Ambrose | 273/276 |
| 4,153,254 | A | * | 5/1979 | Marc | 273/160 |
| 4,257,609 | A | * | 3/1981 | Squibbs | 273/241 |
| 4,662,638 | A | * | 5/1987 | Vachek | 273/160 |
| 4,784,392 | A | * | 11/1988 | Johnson et al. | 273/160 |
| 4,934,701 | A | * | 6/1990 | Ting | 273/160 |
| 4,953,864 | A | * | 9/1990 | Katz | 273/161 |
| 5,000,713 | A | * | 3/1991 | Cheng | 273/160 |
| 5,026,068 | A | * | 6/1991 | Weisser | 273/241 |
| 5,301,953 | A | * | 4/1994 | Levin | 273/276 |
| 5,393,063 | A | * | 2/1995 | Ichimaru | 273/160 |
| 5,403,005 | A | * | 4/1995 | Avila-Valdez | 273/157 R |
| 5,544,882 | A | * | 8/1996 | Sarkar | 273/160 |
| 5,711,524 | A | * | 1/1998 | Bauer et al. | 273/157 R |
| 5,823,533 | A | * | 10/1998 | Edwards | 273/160 |
| 6,637,745 | B1 | * | 10/2003 | Vardanyan | 273/153 R |
| D485,868 | S | * | 1/2004 | Perrin | D21/385 |
| 6,702,285 | B1 | * | 3/2004 | Cheng | 273/157 R |

* cited by examiner

*Primary Examiner*—Derris H. Banks
*Assistant Examiner*—Urszula M. Cegielnik

(57) ABSTRACT

An intellectual building base plate assembling game device comprises a triangular game tray having 28 adjacent slots which is arranged as seven lines, a first line having one slot; a second line having two slots; a third line having third slots, a fourth line having fourth slots; a fifth line having fifth slots, a sixth line having sixth slots, and a seven line having seven slots; and eighteen building blocks of different shapes. Moreover, an intellectual building base plate assembling game device comprising: a planar game tray having a concave slot inside a planar game tray; a fastening element standing on a bottom of the concave slot; and eighteen building blocks of different shapes.

5 Claims, 16 Drawing Sheets

INTELLECTUAL BUILDING BASE PLATE ASSEMBLING GAME DEVICE

The present invention is a continuation in part of U.S. patent Series No. 10/108,490, filed Mar. 29, 2002 now U.S. Pat. 6,702,285 which is assigned to the invention of the present invention, and thus the content of the specification of U.S. Pat. No. 10/108,490 is incorporated into the present invention as a part of the present invention;,

FIELD OF THE INVENTION

The present invention relates to game devices, and particularly to a intellectual building base plate assembling game device.

BACKGROUND OF THE INVENTION

In the prior art, a plurality of different kinds of intellectual building base plates has been disclosed by the inventor of the present invention. For example, in Taiwan Patent No. U.S. Pat. No. 6,220,919. spherical building base plates are disclosed, the building blocks can be arranged from a planar configuration to a stacked and mixed configuration for forming various geometrical shapes having corners with angles of 60 degrees, 90 degrees and 120 degrees. In Taiwan Pat. No. 398313, stacked building base plates capable of making various arrangements are disclosed. Abovementioned patents use nineteen, twelve or nine different building base plates to conduct planar or three-dimensional arrangements and combinations. Furthermore, tray bodies or box bodies are used cooperatively for making creative arrangements to break through the traditional concept of planar combination games.

However, the prior art intellectual building base plate doesn't include three-dimensional stacking methods as in a Russian block game. Therefore, to make the building base plate game more variable and challenging, the inventor of the present invention studied and developed the present invention of intellectual building base plates cooperated with games device.

SUMMARY OF THE INVENTION

Accordingly, the primary object of the present invention is to provide a An intellectual building base plate assembling game device comprises a triangular game tray having 28 adjacent slots which is arranged as seven lines, a first line having one slot; a second line having two slots; a third line having third slots, a fourth line having fourth slots; a fifth line having fifth slots, a sixth line having sixth slots, and a seven line having seven slots; and eighteen building blocks of different shapes. Moreover, an intellectual building base plate assembling game device comprising: a planar game tray having a concave slot inside a planar game tray; a fastening element standing on a bottom of the concave slot; and eighteen building base plates of different shapes.

To enable a further understanding of the structural features of the present invention, the brief description of the views below is followed by the detailed description of the preferred embodiment.

BRIEF DESCRIPTION OF THE VIEWS

DETAILED DESCRIPTION OF THE PREFERRED EMBODIMENTS

Figure 1:
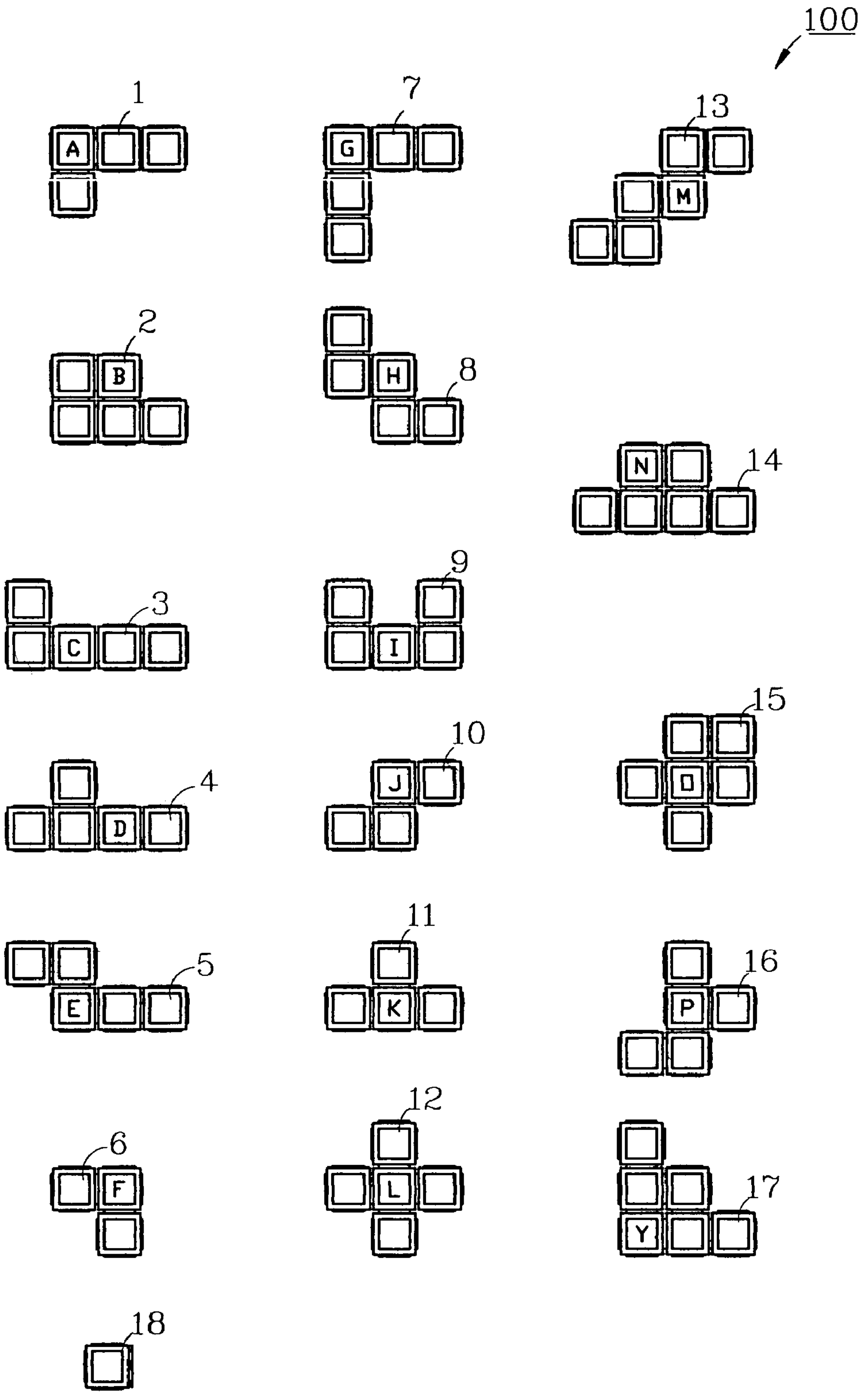
FIG. 1 is a view of the structure of seventeen building base plates of the present invention.
Figure 2A:
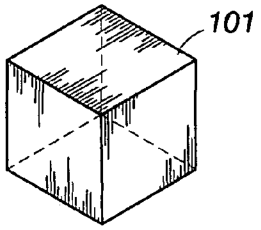
FIGS. 2A and 2B are perspective views about the building base plate of the present invention.

As indicated in FIG. 1, intellectual building base plates (100) of the present invention comprise seventeen building base plates (1 to 17). Each of the building base plate (100) is respectively assembled unequally by three to six units (101), as shown in FIG. 2A. For example, the first building base plate (1) is assembled by four units (101) and the seventeenth block (17) is assembled by six units (101). The shape of the units (101) can be a square, a sphere or a polygon. To make the description easily, the building base plates (100) used in the following introduction are all assembled by cubic units (101). In addition, since the intellectual building base plates (100) of the present invention relate to three-dimensional arrangements, each unit (101) of the seventeen building base plates (1 to 17) is coded by an English letter for easy recognition. The shape of each building base plate (100) is indicated as follows:

(1). The first building base plate is assembled by four adjacent units. The four units are connected cubic blocks which are divided into two banks. An upper bank has three cubic blocks connected side by side and linearly and a lower bank has one cubic block. The cubic block at the lower bank is aligned and adjacent to one cubic block at an end section of the upper bank.

(2) the second building base plate is assembled by five adjacent units. The five units are connected cubic blocks which are divided into two banks. An upper bank has two cubic blocks connected side by side and a lower bank has three cubic blocks connected sides by side. Two of the cubic blocks at the lower bank are aligned and adjacent to the cubic blocks at the upper bank.

(3) The third building base plate is assembled by five adjacent units. The five units are connected cubic blocks which are divided into two banks. An upper bank has one cubic block and a lower bank has four cubic blocks connected side by side and linearly. The cubic block at the upper bank is aligned and adjacent to one cubic block at an end section of the lower bank.

(4) The fourth building base plate is assembled by five adjacent unit. The five units are connected cubic blocks which are divided into two banks. An upper bank has one cubic block and a lower bank has four cubic blocks connected side by side and linearly. The cubic block at the upper bank is aligned and adjacent to one cubic block at the lower bank which is not at end sections of the lower bank.

(5) The fifth building base plate is assembled by five adjacent units. The five units are connected cubic blocks which are divided into two banks. An upper bank has two cubic blocks and a lower bank has three cubic blocks which are connected side by side and linearly. Only one of the cubic block at the upper bank is aligned and adjacent to one cubic block at one end section of the lower bank.

(6) The sixth building base plate is assembled by three adjacent units. The three units are connected cubic blocks which are divided into two banks. An upper bank has two cubic blocks and a lower bank has one cubic block. One of the cubic blocks at the upper bank is aligned and adjacent to the cubic block not at the lower bank.

(7) The seventh building base plate is assembled by five adjacent units. The five units are connected cubic blocks which are divided into three banks. An upper bank has three-cubic blocks which are connected side by side and linearly. A middle bank has one cubic block, and a lower bank has one cubic block. The cubic block at the middle bank is aligned and adjacent to one cubic block at an end section of the upper bank. The cubic block at the lower bank is aligned and adjacent to the cubic block at the middle bank.

(8) The eighth building base plate is assembled by five adjacent units. The five units are connected cubic blocks which are divided into three banks. An upper bank has one cubic block. A middle bank has two cubic blocks which are connected side by side, and a lower bank has two cubic blocks which are connected side by side. The cubic block at the middle bank is aligned and adjacent to one cubic block at the upper bank. Only one of the cubic blocks at the lower bank is aligned and adjacent to another cubic block at the middle bank;

(9) The ninth building base plate is assembled by five adjacent units. The five units arc connected cubic blocks which are divided into two banks. An upper bank has two cubic blocks which are not adjacent to one another and a lower bank has three cubic blocks which are connected side by side and linearly. The cubic blocks at the upper bank are aligned and adjacent to respective cubic blocks, at the lower bank.

(10) The tenth building base plate is assembled by four adjacent units. The four units are connected cubic blocks which are divided into two banks. An upper bank has two cubic blocks which are connected side by side and a lower bank has two cubic blocks which are connected side by side. Only one cubic block at the upper bank is aligned and adjacent to one of the cubic blocks at the lower bank.

(11) The eleventh building base plate is assembled by four adjacent units. The four units are connected cubic blocks which are divided into two banks. An upper bank has one cubic block and a lower bank has three cubic blocks which are connected sides by sides and linearly. The cubic block at the upper bank is aligned and adjacent to one cubic blocks at a middle section of the lower bank.

(12) The twelfth building base plate is assembled by five adjacent units. The five units are cubic blocks and are arranged as a cruciform with four cubic blocks being aligned and adjacent to one cubic block at a center section of the cruciform.

(13) The thirteenth building base plate is assembled by six adjacent units. The six units are connected cubic blocks which are divided into three banks. An upper bank has two cubic blocks which are connected side by side. A middle bank has two cubic blocks which are connected side by side, and a lower bank has two cubic blocks which are connected side by side; only one cubic block at the middle bank is aligned and adjacent to one cubic block of the upper bank. Only one of the cubic blocks at the lower bank is aligned and adjacent to the cubic block at the middle bank, but not colinear to the cubic block at the upper bank.

(14) The fourteenth building base plate is assembled by six adjacent units. The six units are connected cubic blocks which are divided into two banks. An upper bank has two cubic blocks which are connected side by side and a lower bank has four cubic blocks which are connected side by side and linearly. The cubic blocks at the upper bank are aligned and adjacent to two cubic block not at an end section of the lower bank, respectively.

(15) The fifteenth building base plate is assembled by six adjacent units. The six units are cubic blocks. Five units of the six units are arranged as a cruciform with four cubic blocks being aligned and adjacent to one cubic block at a center section of the cruciform; and the other unit of the six unit are aligned and adjacent to two units.

(16) The sixteenth building base plate is assembled by five adjacent units. The five units are connected cubic blocks which are divided into three banks. An upper bank has one cubic block. A middle bank has two cubic blocks which are connected side by side, and a lower bank has two cubic blocks which are connected side by side. The cubic block at the middle bank is aligned and adjacent to one cubic block of the upper bank. Only one of the cubic blocks at the lower bank is aligned and adjacent to the cubic block at the middle bank and is colinear to the cubic block at the upper bank.

(17) The seventh building base plate is assembled by six adjacent units. The seven units are connected cubic blocks which are divided into three banks. An upper bank has one cubic block. A middle bank has two cubic blocks which are connected side by side, and a lower bank has three cubic blocks which are connected side by side and linearly. The cubic block at the middle bank is aligned and adjacent to one cubic block of the upper bank. Two of the cubic blocks at the lower bank are aligned and adjacent to the cubic block at the middle bank, and one cubic block at the end section of the lower bank is aligned and adjacent to the cubic block at the upper bank.

(18) an eigtheenth has only one building base plate.

There are eighty-four units (101) comprised in the seventeen blocks (1 to 17) to make planar or three-dimensional arrangements or stacking assembly. For examples, as shown in FIGS, 3A and 3B, the schematic view of two planar arrangements of the building base plates (100), seventeen building base plates (1 to 17) are arranged to assemble a matrix of 12×7 or 14×6 shown as the second example. Other than these two arrangements, other matrixes can be assembled also; furthermore, users are allowed to arrange in free styles without limitation to form various shapes of tangrams, animals, writings, patterns, etc.

Figure 4:
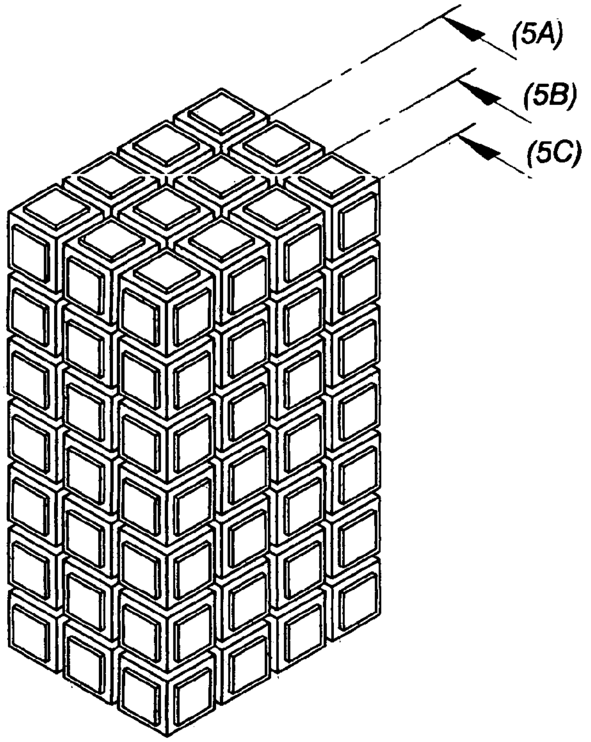
FIG. 4 is a schematic view about a three-dimensional and cubic post stacked by the building base plates shown in FIG. 1.
Figure 5:
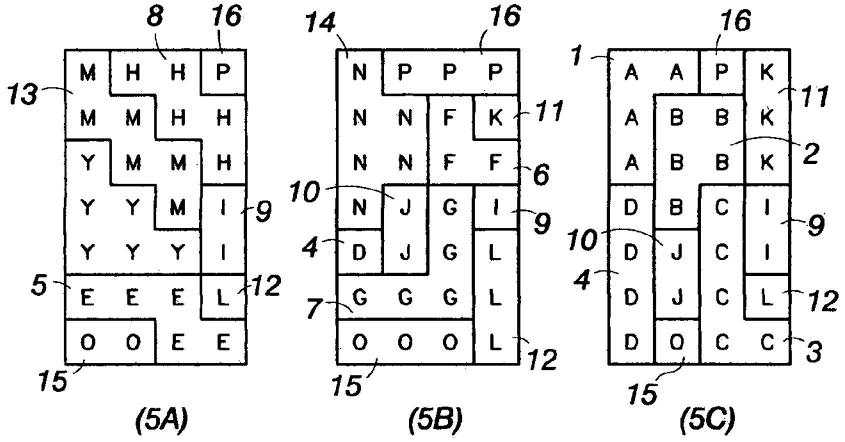
FIG. 5 is a cross-sectional view showing the layers of the three-dimensional and cubic post shown in FIG. 4.

As indicated in FIG. 4, the schematic view of a shape stacked by seventeen building base plates (1 to 17) to form a three-dimensional cubic post of 3×4×7. FIG. 5 shows the cross-sectional view of the arrangement positions of eighty-four units (101) in three layers (5A, 5B and 5C) of the three-dimensional and cubic post shown in FIG. 4. In addition to this example, three-dimensional shapes of 2×2×21 and 2×6×7 can also be stacked.

Figure 6:
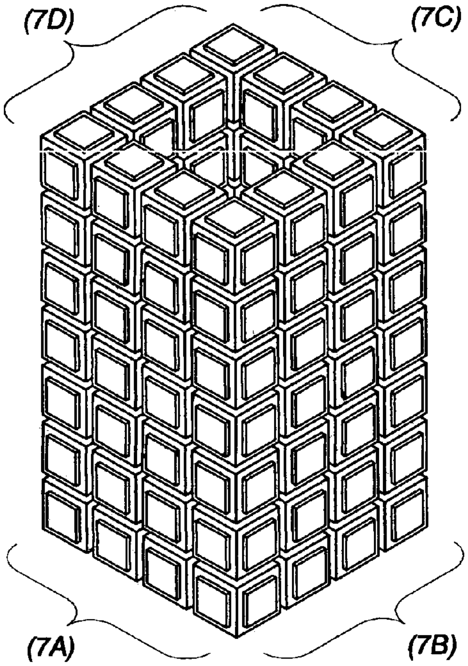
FIG. 6 is a schematic view of a hollow, three-dimensional and cubic post stacked and assembled by the building base plates shown in FIG. 1.
Figure 7:
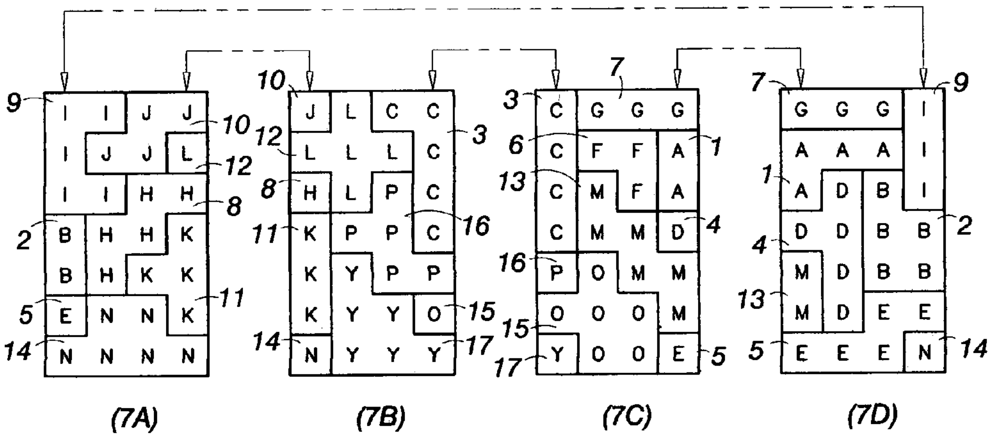
FIG. 7 is a cross-sectional view of each side on the hollow, three-dimensional and cubic post shown in FIG. 6.

As indicated in FIG. 6, the schematic view of a hollow cubic post assembled by seventeen building base plates (1 to 17) with each side formed as a matrix of 4×7. The position of each unit (101) on the spread sides (7A, 7B, 7C and 7D) of the hollow cubic post are shown in FIG. 7. The dotted imaginary lines indicate the positions of the same and repetitive units (101) appeared on each side (7A to 7D) for better recognition viewed from different angles.

Figure 8:
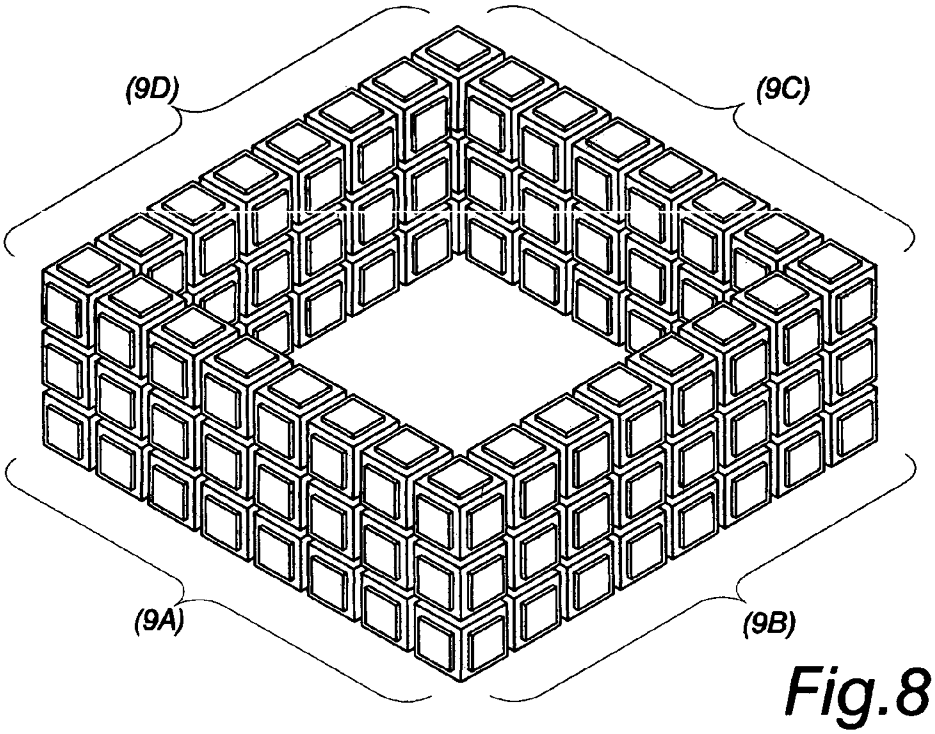
FIG. 8 is a schematic view of a hollow castle stacked and assembled by the building base plates shown in FIG. 1.
Figure 9:
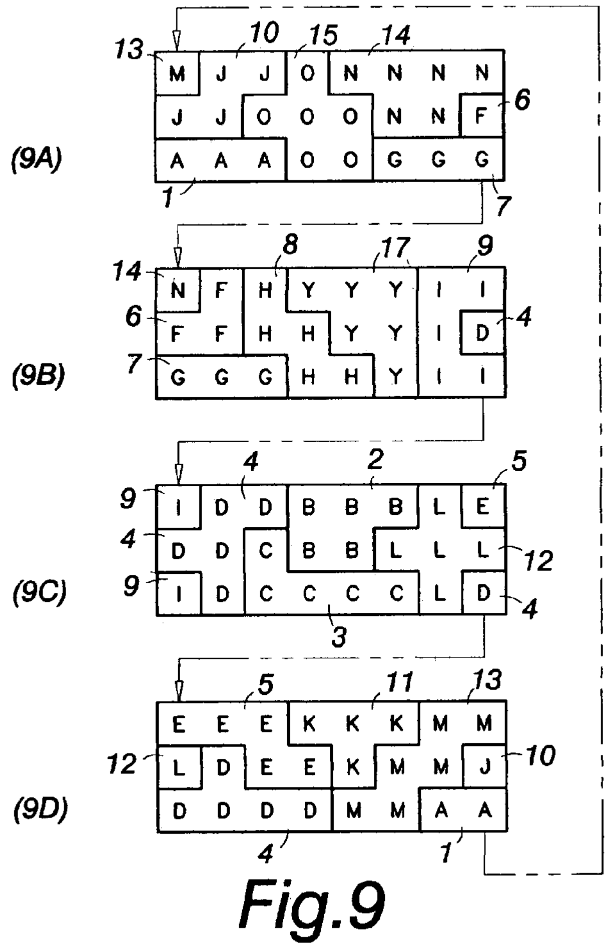
FIG. 9 is a cross-sectional view of each side on the hollow and three-dimensional castle shown in FIG. 8.

As indicated in FIG. 8, the schematic view of another three-dimensional and hollow stack assembled by seventeen building base plates (1 to 17) to form a shape similar to a enclosed wall or a castle with a matrix of 8×3 on each side. The position of each unit (101) on the spread sides (9A, 9B, 9C and 9D) of the hollow cubic post are shown in FIG. 9. The dotted imaginary lines indicate the positions of the same and repetitive units (101) appeared on each side (9A to 9D) for better recognition viewed from different angles.

Figure 10:
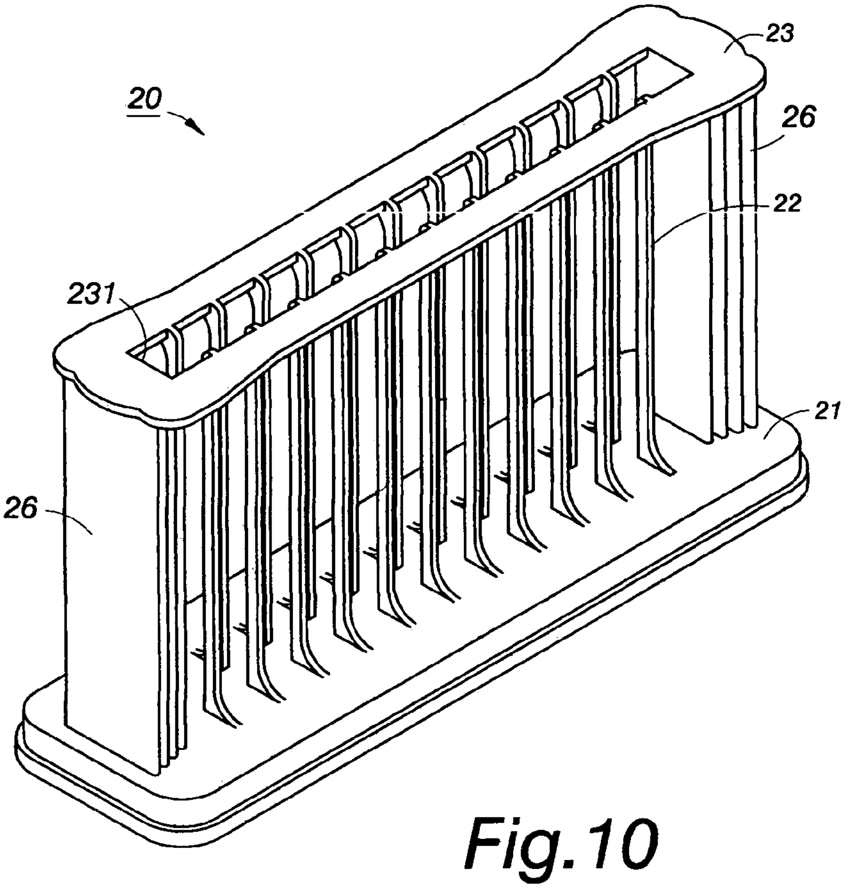
FIG. 10 is a perspective view of a game frame of the present invention.
Figure 11:
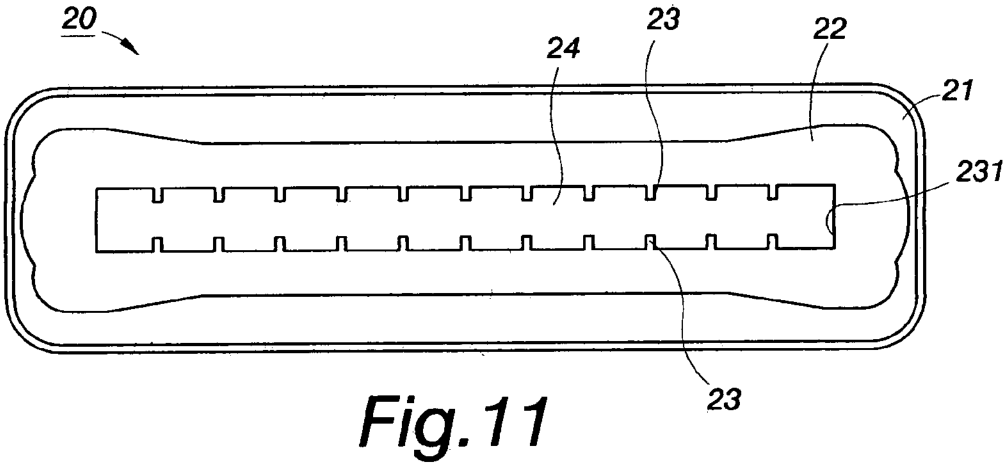
FIG. 11 is a bird's-eye view of the game frame shown in FIG. 10.

In order to make different intellectual games through using the building base plates (100), the present invention provides cooperated game devices comprising a game frame, a triangular game tray and a planar game tray; wherein, the game frame (20), as shown in FIG. 10, includes a bottom seat (21), a plurality of parallel, equally spaced paling rods (22) on the bottom seat (21), two pieces of lateral stop plates (26) disposed at two ends of the bottom seat (21) and a top plate (23) fixed on the paling rod (22) and the stop plate (26). To observe the game frame (20) from a bird's-eye view as shown in FIG. 11, it shows that the slot opening (231) of the top plate (23) and the paling rods (22) are arranged in two rows symmetrically defining a guide slot (24) for guiding in the building base plates (100).

Figure 2B:
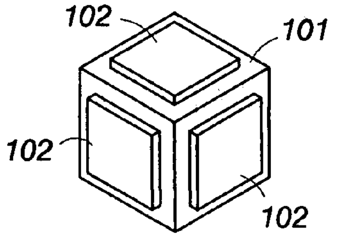
Figure 12:
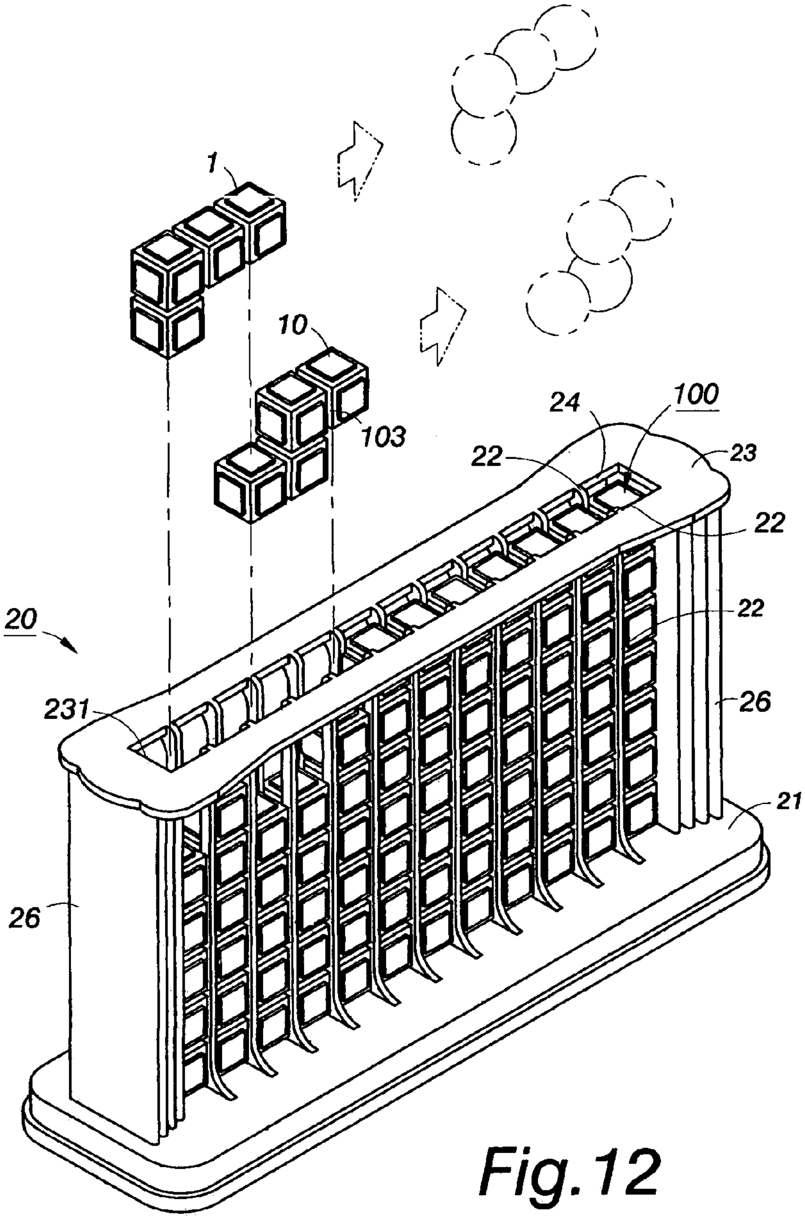
FIG. 12 is a schematic view of the building base plates applied with the cooperated game frame of the present invention.
Figure 13A:
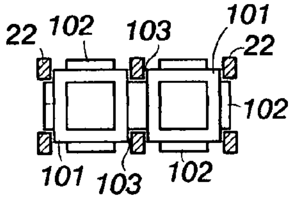
FIGS. 13A and 13B are schematic views of units of the building base plates cooperated with paling rods of the present invention.
Figure 13B:
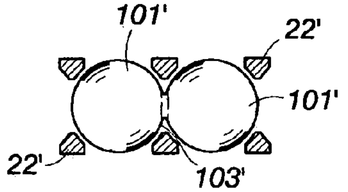

As indicated in FIG. 12, the schematic view showing that the building base plates (100) applied with the cooperated game frame (20), all building base plates (1 to 17) are placed and arranged in the guide slot (24) of the game frame (20). The feature thereof is that all units (101) of the building base plates (100) are connected by a convex block (102), as shown in FIG. 2B. The formation of the convex block (102) defines a concave ring groove (103), as shown in FIG. 13. Therefore, when the building base plates (1 to 17) are placed into the guide slot (24) of the game frame (20), the concave groove (103) cooperates with the left and right paling rods (22) in double rows to function for positioning and downwards sliding. Especially, with the insertion of the double paling rods (22), the concave groove (103) allows the building base plates (100) only to move downwardly but not horizontally. Therefore, every building base plate (100) placed into the slot opening (231) descends vertically along the paling rods (22) disposed on two sides of the guide slot (24). In detachment, they can be plunked vertically and upwardly by the user's finger. Furthermore, when the shape of the unit (101) of the building base plate (100) changes, the shape of the paling rod (22) has to be alternated accordingly for fitting the unit (101). As shown in FIG. 13B, for a spherical unit (101'), the paling rod (22') is alternated to have tapered sections for coordinating the concave groove (103') among the spherical units (101') so as to achieve the best positioning and sliding effect.

Figure 3A:
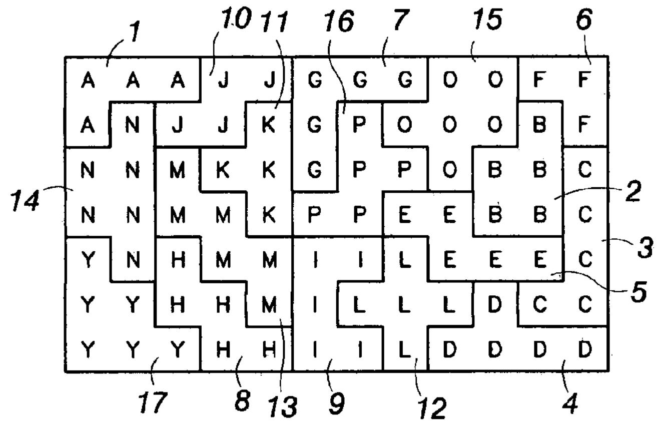
FIGS. 3A and 3B are plane views of a matrix arranged and assembled by the building base plates shown in FIG. 1.
Figure 3B:
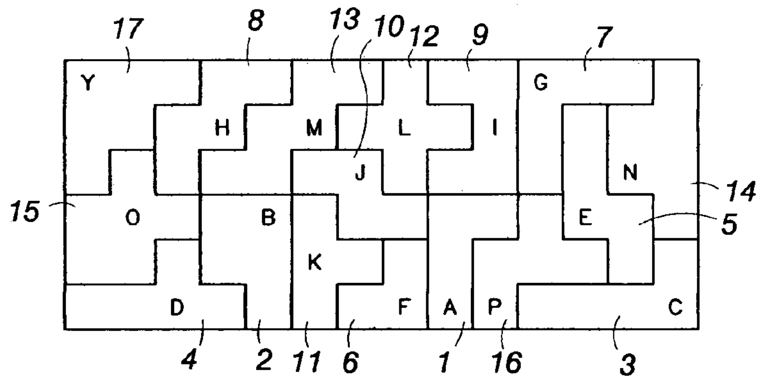

The positioning function of the paling rods (22) of the game frame (20) facilitates the assembly and arrangement of the building base plates (1 to 17) inside the guide slot (24). The game rules thereof are similar to that of the Russian block game. The stacked building base plates (100) won't be knocked down due to unintentional bump. The arrangement of the building base plates (100) can be transferred from a planar one to an upstanding one, as shown in FIG. 3A. Furthermore, each unit (101) of the building base plate (100) is disposed with a convex block (102) allowing the building base plate (100) inside the guide slot (24) to be taken out from the bottom to the top through a finger's plunking movement. Without the disposition of the convex block (102) on each side of the unit (101), it is hard to plunk the building base plate (100) upwardly by a finger; even the Russian block game does not provide a concave groove on a building base plate or a paling rod on a game frame to allow the building base plate conduct vertical arrangement or assembly within a limited space.

Figure 14A:
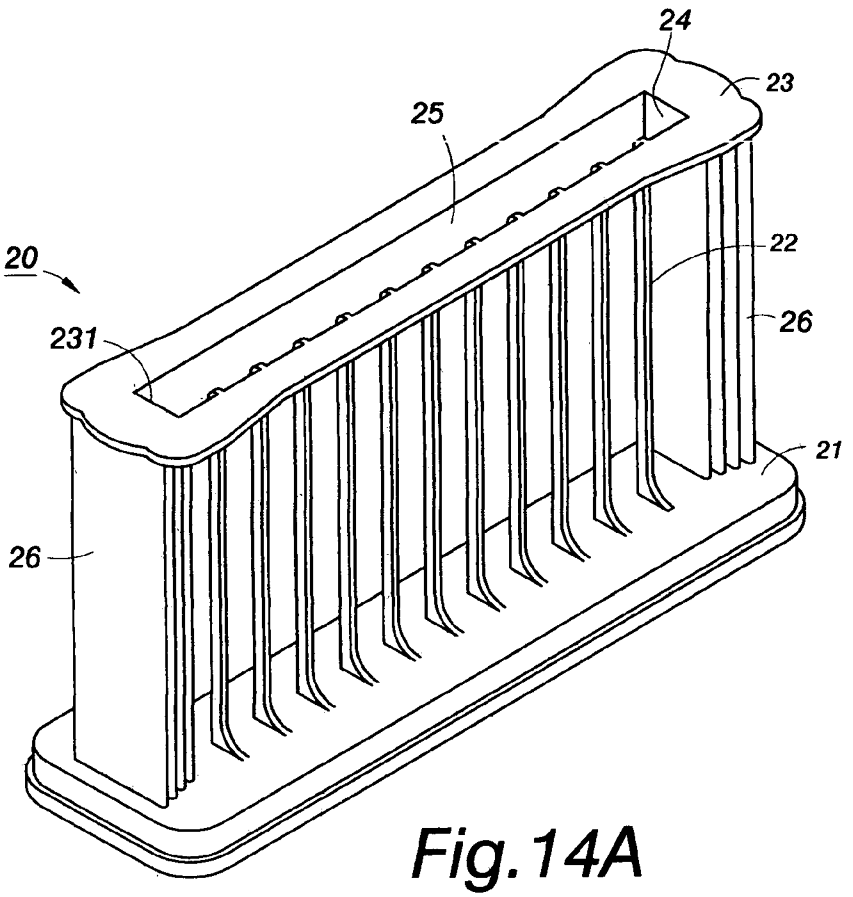
FIG. 14A is a view of an exemplary embodiment of another game frame of the present invention.
Figure 14B:
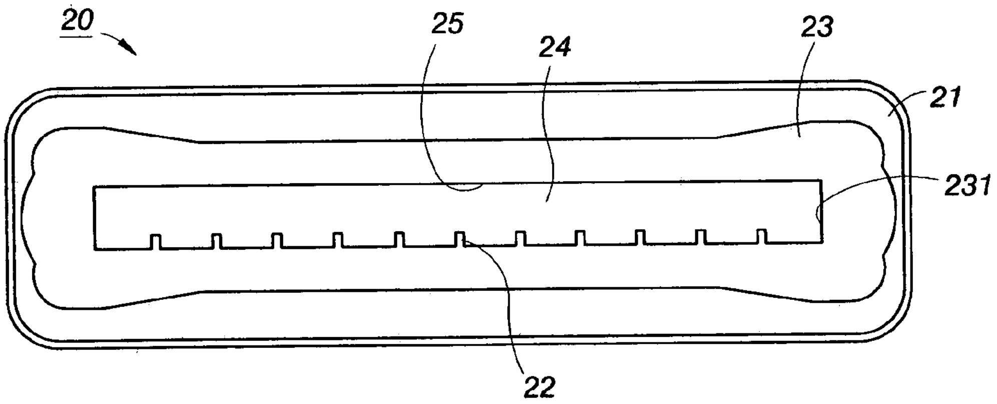
FIG. 14B is a bird's-eye view of the game frame shown in FIG. 14A.
Figure 15A:
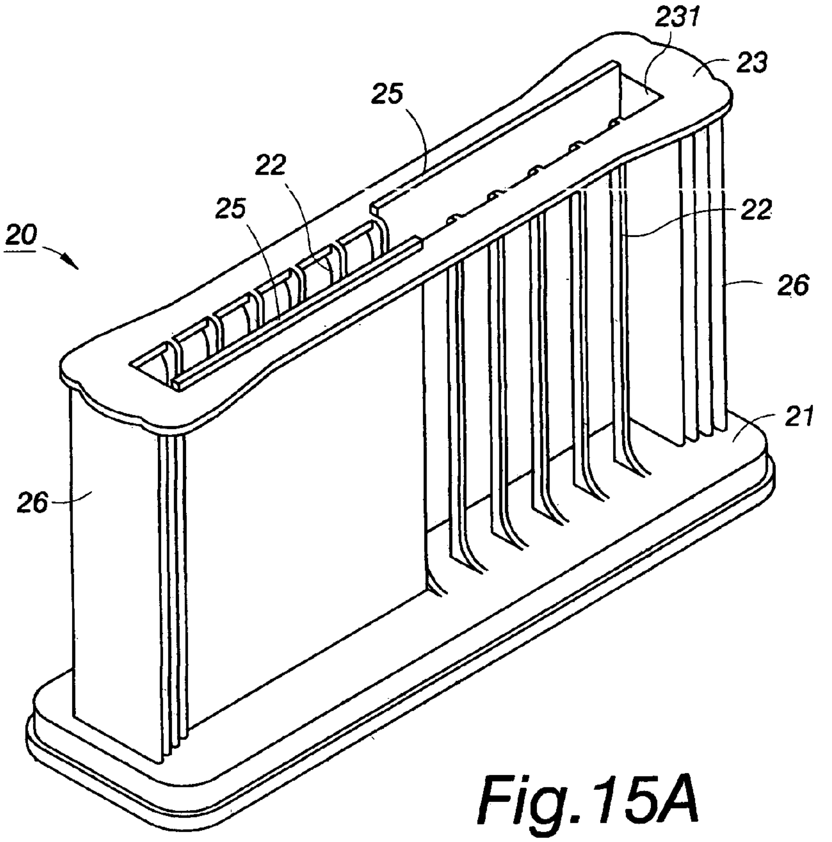
FIG. 15A is a view of an exemplary embodiment of another game frame of the present invention.
Figure 15B:
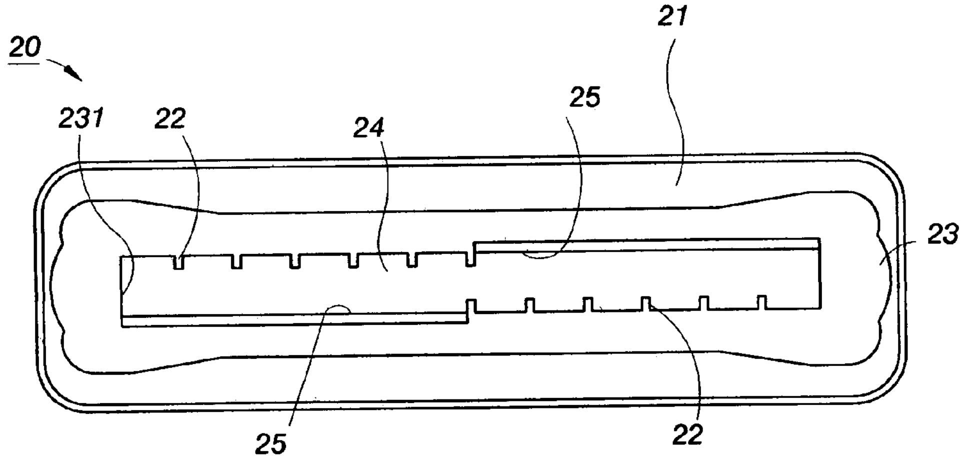
FIG. 15B is a bird's-eye view of the game frame shown in FIG. 15A.

As indicated in FIGS. 14A and 14*b*, the paling rods (22) inside the guide slot (24) of the game frame (20) are disposed in a single row with a wall plate (25) disposed on the other side thereof. The building base plates (100) are guided into the guide slots (24) along the single-rowed paling rods (22). The advantage of this game is that the wall plate (25) screens to prevent the opponents from peeking each other's way of arranging the building base plates (100). Additionally, as indicated in FIGS. 15A and 15B, both sides of the guide slot (24) are disposed with paling rods (22) and wall plates (25) to respectively occupy half of the area thereof. The paling rods (22) and a wall plates (25) on two sides are staggered in disposition to allow two players to sit across each other for conducting an intellectual game competition. That means, each player only plays on one half side of the game frame and the components are unable to see each other's arrangement of the building base plates (100) due to the screening function of the wall plates (25). Whoever finished filling the guide slot (24) with the building base plates (100) first wins. The wall plate (25) can be disposed in a permanently fixed or a moveable and extractable method; being a extractable one, the moveable wall plate (25) can be substituted by a plate-type and moveable paling rod (22).

Figure 16:
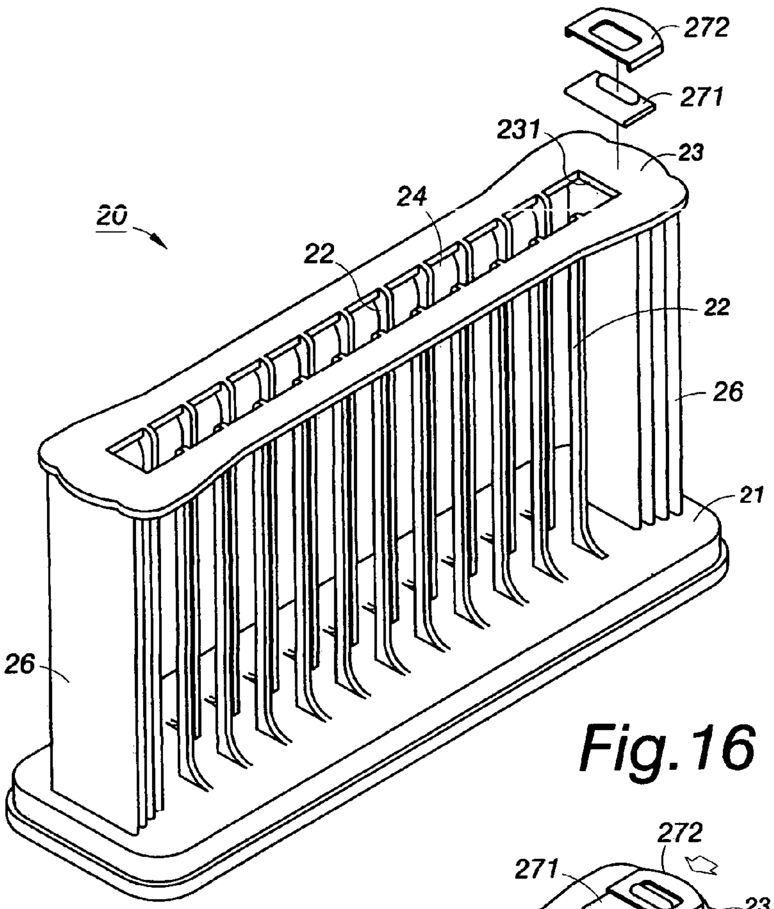
FIG. 16 is a schematic view of a game frame disposed with a stop plate of the present invention.
Figure 17:
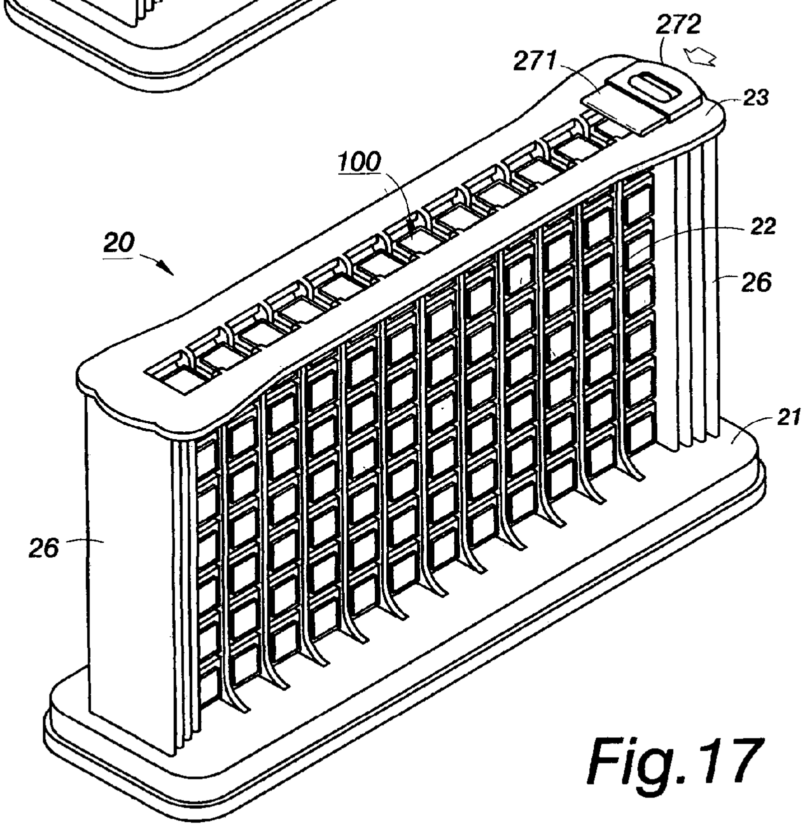
FIG. 17 is a schematic view of the applying the building base plates with the cooperated game frame shown in FIG. 16.
Figure 18A:
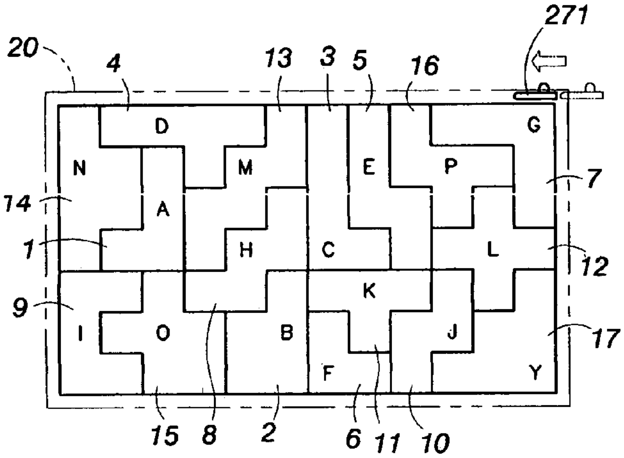
FIGS. 18A and 18B are schematic views of the stop plate of the game frame limiting the movement of the building base plates of the present invention.
Figure 18B:
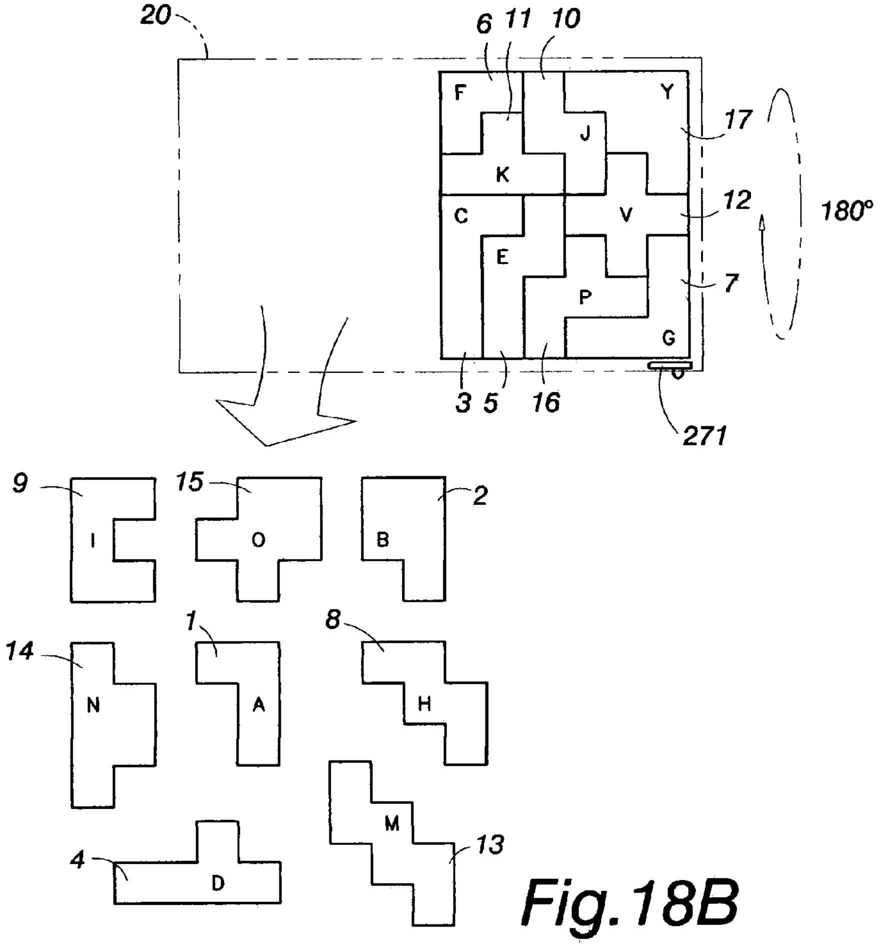
Figure 19:
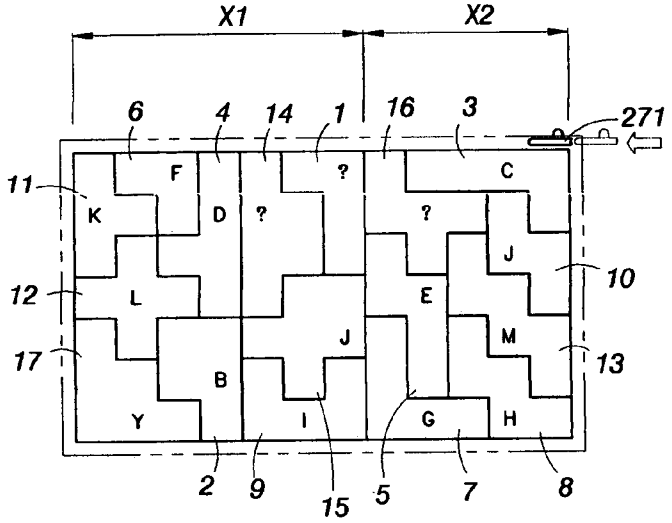
FIG. 19 is a schematic view of the stop plate of the game frame limiting the movement of the building base plates of the present invention.

As indicated in FIG. 16, a stop slot (272) is disposed at the lateral end of the slot opening (231) on the game frame (20). A slop plate (271) to be pushed in and out is disposed inside the stop slot (272). After being plunked outwardly by a finger, as shown in FIG. 17, the stop plate (271) stops the building base plates (100) at the right end of the slot opening (231) and prevents them from coming out. FIG. 18A further illustrates that the protruded stop plate (271) on the right hand side of the game frame (20) causes the building base plates (100) on the half right hand side of the guide slot (24) to resist against each other. For example, after being stopped by the stop plate (271), the seventh building base plate (7) is unable to detach from the guide slot (24), so it pushes against the other building base plates (16, 5 and 3) at the upper aspect. These four building base plates (7, 16, 5 and 3) unite to blockade the half right hand side of the guide slot (24) of the game frame (20) to prevent the building base plates (100) on the half right hand side from separating from the guide slot (24). However, without the stopping from the stop plate (271), the building base plates (100) on the half left hand side are able to detach from the guide slot (24) of the game frame (20); as indicated in 18B, after the game frame (20) is turned at 180°, the building base plates (3, 5, 6, 7, 10, 11, 12, 16 and 17 are stopped by the stop plates (271) to produce interlocking resistance and unable to detach. However, without any stopping, the building base plates (1, 2, 4, 8, 9, 13, 14 and 15) are able to be dumped out from the guide slot (24) of the game frame (20). Therefore, the half left hand side of the game frame (20) is available for the player to use so as to reduce the difficulty of the game and the length of playing time. To arrange seven building base plates (100) is easier than arranging seventeen building base plates (100) and easier for younger children to play. In the previous drawings, the controlled numbers of the interlocking control produced by the building base plates (100) through the stop plate (271) are limited to ½, ⅓ or 2 speed change gear set 3. For example, as shown in FIG. 19, when the stop plate (271) stops ⅓ area of the building base plates (100) indicated as X2, the left ⅔ area of building base plates (100) indicated as X1 are moveable for arrangement and assembly.

Figure 20:
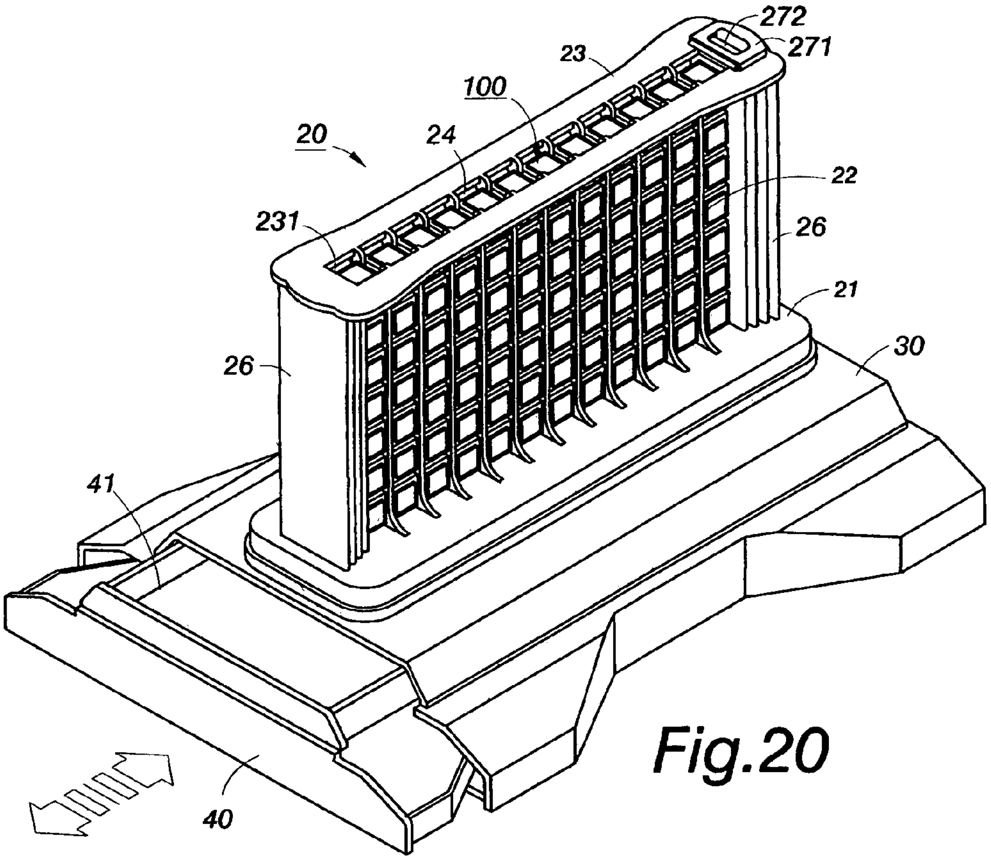
FIG. 20 is a schematic view of the game frame disposed with a box body of the present invention.
Figure 21:
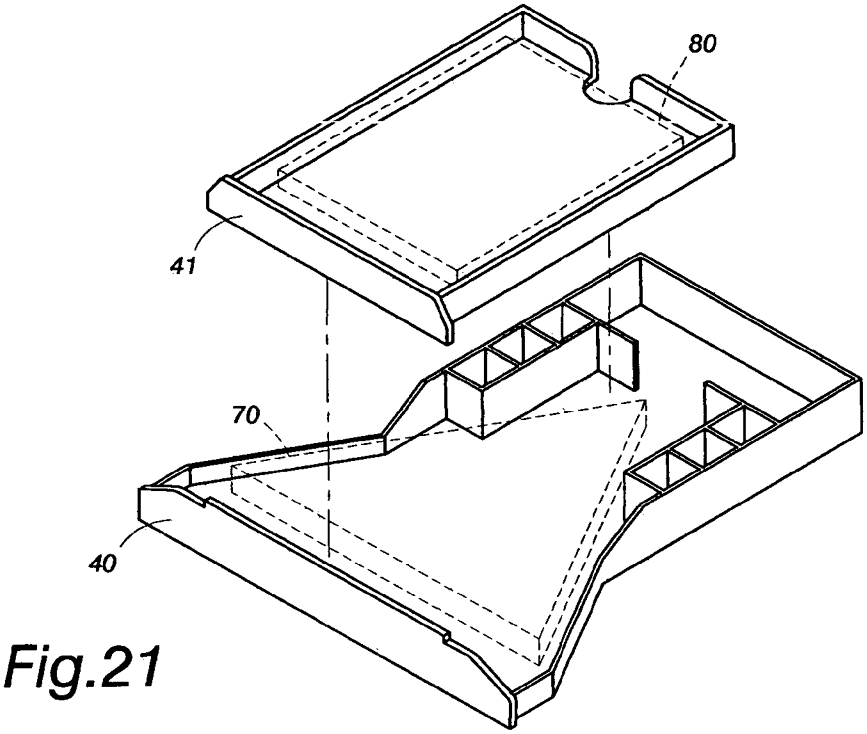
FIG. 21 is a schematic view of applying the box body of the game frame of the present invention.

As indicated in FIG. 20, it is illustrated that a box body (30) is added to the bottom ,end of the game frame (20) to not only increase the bottom area thereof to prevent turning or tilting over, but -also allow a dragging tray (40) to be placed in laterally; another dragging tray (41) can be stacked on top of the dragging tray (40), wherein the dragging tray (40) is provided for receiving a triangular game tray (70), as indicated in FIG. 21. The dragging tray (41) is provided for receiving a planar game tray (80), a game handbook and other objects.

Figure 22:
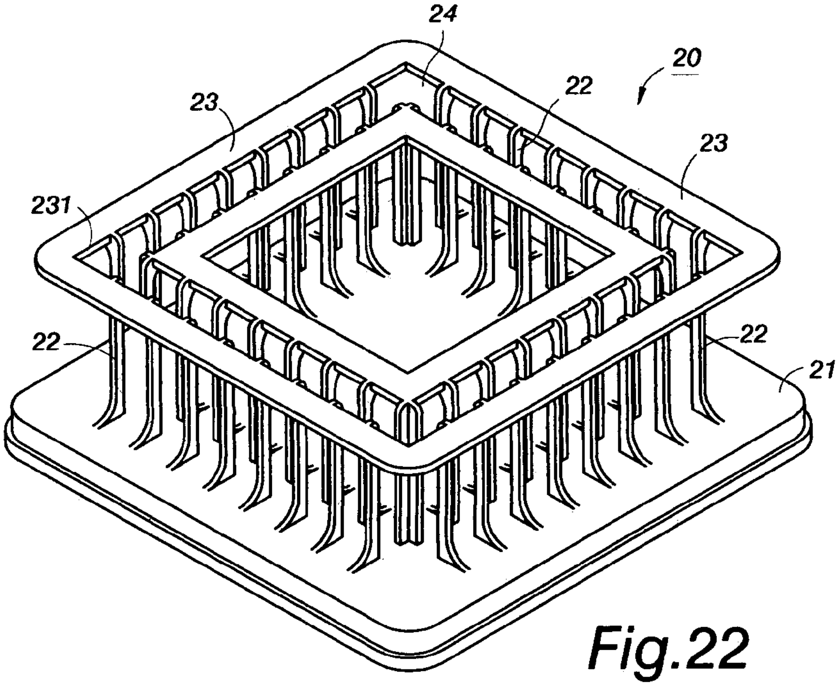
FIG. 22 is a view of an exemplary embodiment of another game frame of the present invention.

As indicated in FIG. 22, the structural view of another game frame (20) is illustrated, wherein the game frame (20) is higher and encloses around to define a middle yard at the center; when playing, the three-dimensional castle stacked by the building base plates (100) shown in FIG. 8 is moved to the game frame (20) indicated in FIG. 22. However, the game involving the game frame (20) and the building base plates (1 to 17) is more difficult than that using only the building base plates (1 to 17).

Figure 23:
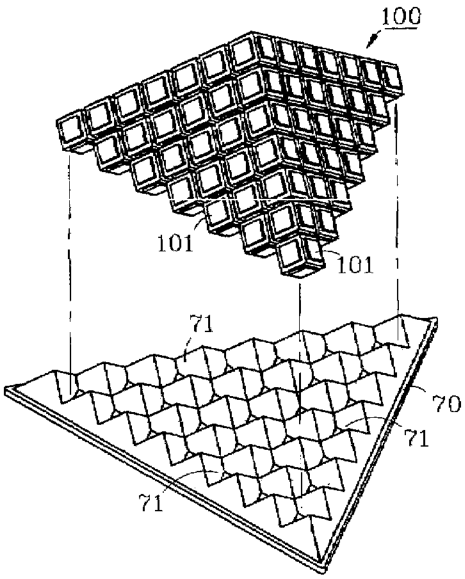
FIG. 23 is a schematic view of a triangular game tray of the present invention.
Figure 24:
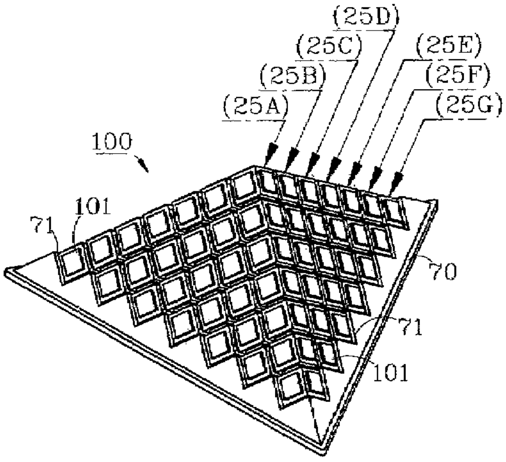
FIG. 24 is a view of applying the building base plates with the triangular game tray shown in FIG. 23.
Figure 25:
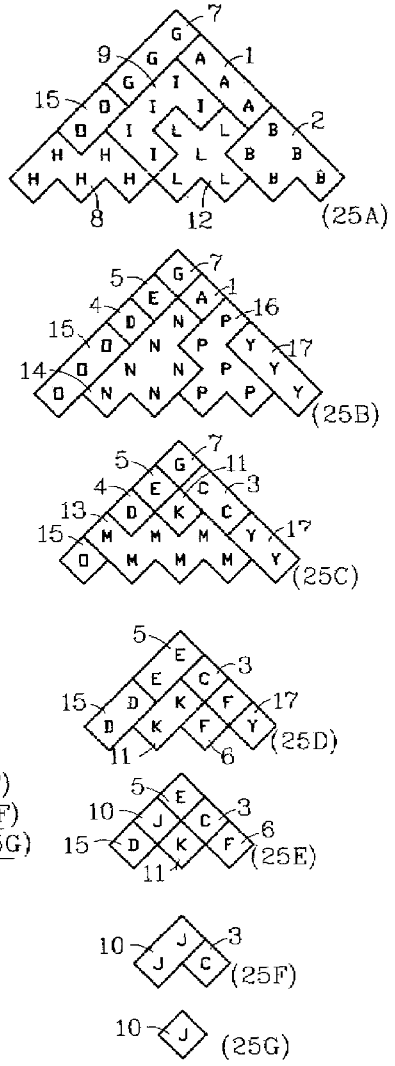
FIG. 25 is a cross-sectional view of the layers of the pyramid shown in FIG. 24.

As indicated in FIG. 23, the schematic view of the building base plate (100) and the triangular game tray (70) of the present invention is illustrated, wherein the triangular game tray (70) is an equilateral triangle as observed from a bird's-eye view. Twenty-eight adjacent tapered slots (71) are disposed thereon with seven tapered slots (71) on the outmost side on each lateral side. The tapered slots (71) allow the units (101) to be obliquely placed in for positioning to further make the building base plates (1 to 17) stack obliquely to assemble a triangular and tapered pyramid, as shown in FIG. 24. As indicated in FIG. 25, the cross-sectional view of all layers of the triangular and tapered shape shown in FIG. 4, wherein this triangular pyramid composes seven layers (25A to 25G) from the bottom to the top. Therefore, the seventeen building base plates (1 to 17) are capable of arranging a pyramid of seven layers. If the units (101) of the building base plates (100) are in spherical or polygonal shapes, the shapes of the tapered slots (71) have to be alternated into arch-shaped or polygonal slots. Although arch-shaped or polygonal slots are different from the tapered slots (71), from the visual judgment, to play the game with tapered slots(71) is more difficult than playing the game of the other two kinds of slots.

Figure 26:
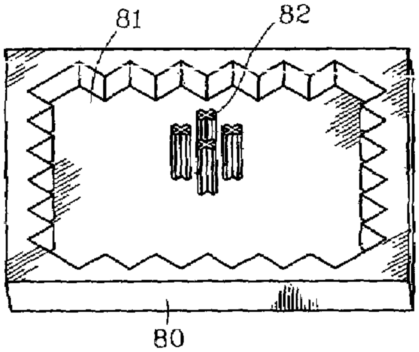
FIG. 26 is a perspective view of a planar game tray of the present invention.
Figure 27:
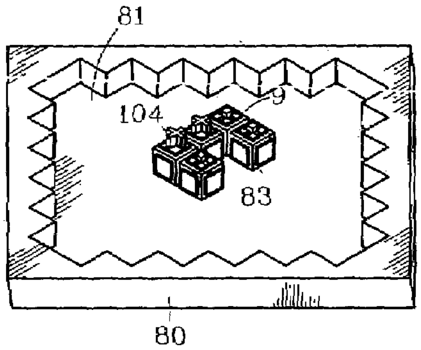
FIG. 27 is a schematic view of positioning the building base plates by the planar game tray shown in FIG. 26.
Figure 28:
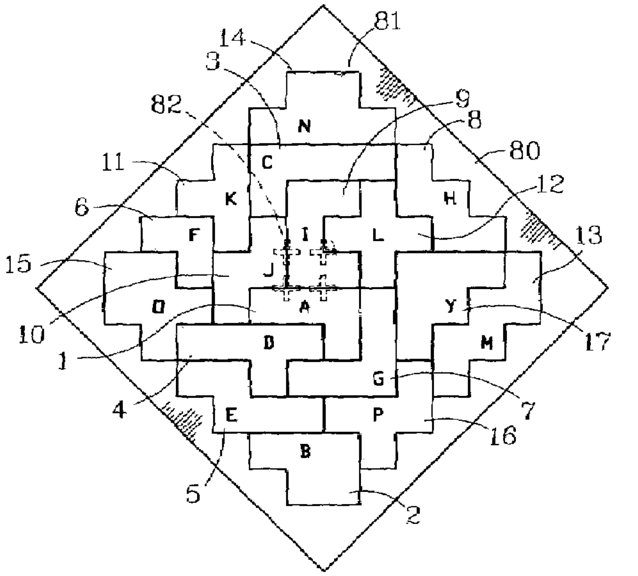
FIG. 28 is a view of applying the building base plates and the planar game tray shown in FIG. 26.

As indicated in FIG. 26, the perspective view of a planar game tray (80) of the present invention is illustrated; wherein a concave slot (81) is disposed inside the planar game tray (80). The line of the concave slot (8) can be substituted by a plane contour lines. The concave slot (81) fitly receives seventeen building base plates (1 to 17) assembled in a planar arrangement by fourteen units (101). Each side of the concave slot (81) has a plurality of rhombic angles. A fastening element (82) is disposed at the center of or a proper position in the concave slot (81). The fastening element (82) are two or four short standing posts inserted upright at predetermined positions. The sections of the short standing posts has L-shape or a cross-shape. Since the short standing post is inserted into the concave groove (103) of the building base plates (100), the enclosed space fitly receives the insertion of a unit (101). Therefore, the space is used as a positioning space. When any of the seventeen building base plates (1 to 17) is placed into the positioning space by its own unit (101). The direction, angle and position of the building base plate (1 to 17) is thus limited. The building base plate (1 to 17) is thereby used as the starting point for the game. The other building base plates (100) are sequentially placed into the concave slots (81) of the game frame (80) till it is filled. For example, as shown in FIG. 27, the ninth building base plate (9) is placed first; it is placed flatly inside the concave slot (81) and one unit (101) thereof is placed into the positioning space formed by the fastening element (81). Then the other building base plates (100) are sequentially placed into the concave slots (81) untill it is filled. The ninth building base plate (9) has five units (101), so any of the units (101) placed into the positioning space determines the final figure to be assembled by the following building base plates (1 to 17). For example, any of the units (101) of the ninth building base plate (9) can be placed into the positioning space in four different directions and at four different angles to face the front or the back. Therefore, there are 5×4×2=40 kinds of positions deviated. That means, there are already 40 planar arrangements for the ninth building base plate (9) only. Still, there are sixteen more different building base plates (100) to be arranged. Therefore, any change of the direction, angle, position, the front or the back side of the unit (101) of the building base plate (100) completely changes the planar arrangement of the building base plates (100). The arrangements of seventeen building base plates (1 to 17) are capable of deviating unlimited variations. Furthermore, the fastening element (81) is used for limiting one unit (101). However, in the same way, the fastening element (81) can be used to limit two or three unequal units (101). Therefore, the positioning pattern of the present invention uses the fastening element (18) to limit at least but not only one unit (101) of the building base plates (100).

Figure 29:
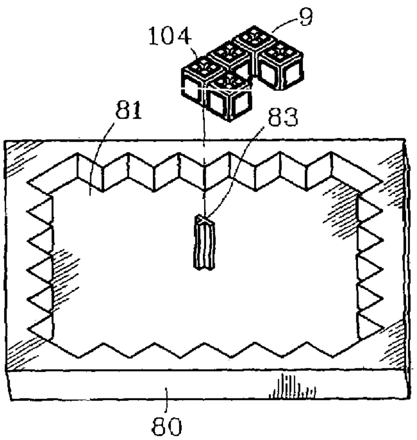
FIG. 29 is a perspective view of another planar game tray with the building base plates of the present invention.
Figure 30:
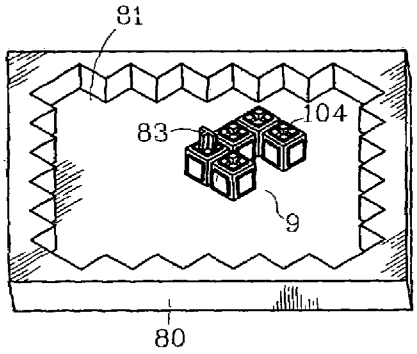
FIG. 30 is a schematic view of positioning the building base plates and the planar game tray shown in FIG. 29.
Figure 31:
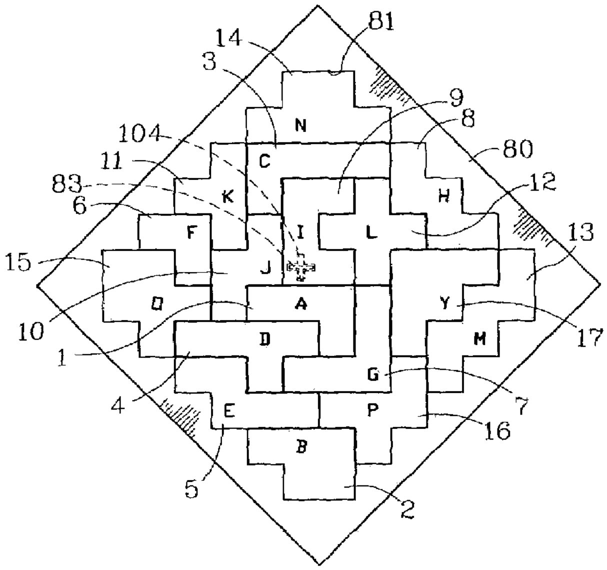
FIG. 31 is a view of applying the building base plates with the cooperating planar game tray shown in FIG. 29.

As indicated in FIG. 29, the structural view of another planar game tray (80') and the building base plates (100) is illustrated, wherein the fastening element (83) of the planar game tray (80') has at least one supporting post in T or cross shape; every unit (101) of the building base plates (1 to 17) is disposed with a cross-shaped through hole (10). The building base plate (100) is positioned with the fastening element (83) by means of the cross-shaped through hole (104) of each unit (101). For example, the ninth building base plate (9) in FIG. 30 is positioned by having the cross-shaped through hole (104) of every unit (101) penetrated by the fastening element (83). Since the direction, angle and position of the ninth building base plate (9) is limited, the other sixteen building base plates (100) are sequentially placed in the concave slot (81) until it is filled, as shown in FIG. 31. Therefore, the coordination of the planar game tray (80') and the seventeen building base plates (1 to 17) is capable of deviating unlimited variations.

It should be noted that in above example, each building unit has a cubic block. However, the present invention is not confined to this configuration, other configurations are allowable. For example, the building unit may be a round ball, as shown in FIG. 11B.

It is of course to be understood that the embodiment described herein is merely illustrative of the principles of the invention and that a wide variety of modifications thereto may be effected by persons skilled in the art without departing from the spirit and scope of the invention as set forth in the following claims.

The invention claimed is:

1. An intellectual building base plate assembling game device comprising a triangular game tray having 28 adjacent slots which is arranged as seven lines, a first line having one slot; a second line having two slots; a third line having third slots, a fourth line having fourth slots; a fifth line having fifth slots, a sixth line having sixth slots, and a seven line having seven slots;

eighteen building blocks containing the following shapes, wherein (1) a first building base plate is assembled by four adjacent units; the four units are connected blocks which are divided into two banks; an upper bank has three blocks connected side by side and linearly and a lower bank has one block; the block at the lower bank is aligned and adjacent to one block at an end section of the upper bank;

(2) a second building base plate is assembled by five adjacent units; the five units are connected blocks which are divided into two banks; an upper bank has two blocks connected side by side and a lower bank has three blocks connected sides by side; two of the blocks at the lower bank are aligned and adjacent to the blocks at the upper bank;

(3) a third building base plate is assembled by five adjacent units; the five units are connected blocks which are divided into two banks; an upper bank has one block and a lower bank has four blocks connected side by side and linearly; the block at the upper bank is aligned and adjacent to one block at an end section of the lower bank;

(4) a fourth building base plate is assembled by five adjacent unit; the five units are connected blocks which are divided into two banks; an upper bank has one block and a lower bank has four blocks connected side by side and linearly; the block at the upper bank is aligned and adjacent to one block at the lower bank which is not at end sections of the lower bank;

(5) a fifth building base plate is assembled by five adjacent units; the five units are connected blocks which are divided into two banks; an upper bank has two blocks and a lower bank has three blocks which are connected side by side and linearly; only one of the block at the upper bank is aligned and adjacent to one block at one end section of the lower bank;

(6) a sixth building base plate is assembled by three adjacent units; the three units are connected blocks which are divided into two banks; an upper bank has two blocks and a lower bank has one block; one of the blocks at the upper bank is aligned and adjacent to the block not at the lower bank;

(7) a seventh building base plate is assembled by five adjacent units; the five units are connected blocks which are divided into three banks; an upper bank has three blocks which are connected side by side and linearly; a middle bank has one block, and a lower bank has one block; the block at the middle bank is aligned and adjacent to one block at an end section of the tipper bank; the block at the lower bank is aligned and adjacent to the block at the middle bank;

(8) a eighth building base plate is assembled by five adjacent units; the five units are connected blocks which are divided into three banks; an upper bank has one block; a middle bunk has two blocks which are connected side by side, and a lower bank has two blocks which are connected side by side; the block at the middle bank is aligned and adjacent to one block at the upper bank; only one of the blocks at the lower bank is aligned and adjacent to another block at the middle bank;

(9) a ninth building base plate is assembled by five adjacent units; the five units are connected blocks which are divided into two banks; an upper bank has two blocks which are not adjacent to one another and a lower bank has three blocks which are connected side by side and linearly; the blocks at the upper bank are aligned and adjacent to respective blocks at the lower bank;

(10) a tenth building base plate is assembled by four adjacent units; the four units are connected blocks which are divided into two banks; an upper bank has two blocks which are connected side by side and a lower bank has two blocks which are connected side by side; only one block at the upper bank is aligned and adjacent to one of the blocks at the lower bank;

(11) a eleventh building base plate is assembled by four adjacent units; the four units are connected blocks which are divided into two banks; an upper bank has one block and a lower bank has three blocks which are connected sides by sides and linearly; the block at the upper bank is aligned and adjacent to one blocks at a middle section of the lower bank;

(12) a twelfth building base plate is assembled by five adjacent units; the five units are blocks and are arranged as a cruciform with four blocks being aligned and adjacent to one block at a center section of the cruciform;

(13) a thirteenth building base plate is assembled by six adjacent units; the six units are connected blocks which are divided into three banks; an upper bank has two blocks which are connected side by side; a middle bank has two blocks which are connected side by side, and a lower bank has two blocks which are connected side by side; only one block at the middle bank is aligned and adjacent to one block of the upper bank; only one of the blocks at the lower bank is aligned and adjacent to the block at the middle bank, but not colinear to the block at the upper bank;

(14) a fourteenth building base plate is assembled by six adjacent units; the six units are connected blocks which are divided into two banks; an upper bank has two blocks which are connected side by side and a lower bank has four blocks which are connected side by side and linearly; the blocks at the upper bank are aligned and adjacent to two block not at an end section of the lower bank, respectively;

(15) a fifteenth building base plate is assembled by six adjacent units; the six units are blocks; five units of the six units are arranged as a cruciform with four blocks being aligned and adjacent to one block at a center section of the cruciform; and the other unit of the six unit are aligned and adjacent to two units;

(16) a sixteenth building base plate is assembled by five adjacent units; the five units are connected blocks which are divided into three banks; an upper bank has one block; a middle bank has two blocks which are connected side by side, and a lower bank has two blocks which are connected side by side; the block at the middle bank is aligned and adjacent to one block of the upper bank; only one of the blocks at the lower bank is aligned and adjacent to the block at the middle bank and is colinear to the block at the upper bank;

(17) a seventh building base plate is assembled by six adjacent units; the seven units are connected blocks which are divided into three banks; an upper bank has one block; a middle bank has two blocks which are connected side by side, and a lower bank has three blocks which are connected side by side and linearly: the block at the middle bank is aligned and adjacent to one block of the upper bank; two of the blocks at the lower bank are aligned and adjacent to the block at the middle bank, and one block at the end section of the lower bank is aligned and adjacent to the block at the upper bank; and

(18) an eigtheenth has only one building base plate;

wherein in playing the game, some of the building base plates are accumulated on the triangular game tray so that so as to form an egyptian structure with reduced units on the upper layers;

wherein each block has shape selected from one of a square block, a spheric block and a polygon block; the slot of the game tray is a shape selected from one of a tapered slot, an arch slot and a polygonal slot to cooperate with the units.

2. An intellectual building base plate assembling game device comprising:

a planar game tray having a concave slot inside a planar game tray;

a fastening element standing on a bottom of the concave slot;

eighteen builing blocks containing the following shapes, wherein (1) a first building base plate is assembled by four adjacent units; the four units are connected blocks which are divided into two banks; an upper bank has three blocks connected side by side and linearly and a lower bank has one block; the block at the tower bank is aligned and adjacent to one block at an end section of the upper bank;

(2) a second building base plate is assembled by five adjacent units; the five units are connected blocks which are divided into two banks; an upper bank has two blocks connected side by side and a lower bank has three blocks connected sides by side; two of the blocks at the lower bank are aligned and adjacent to the blocks at the upper bank;

(3) a third building base plate is assembled by five adjacent units; the five units are connected blocks which are divided into two banks; an upper bank has one block and a lower bank has four blocks connected side by side and linearly; the block at the upper bank is aligned and adjacent to one block at an end section of the lower bank;

(4) a fourth building base plate is assembled by five adjacent unit; the five units are connected blocks which are divided into two banks; an upper bank has one block and a lower bank has four blocks connected side by side and linearly; the block at the upper bank is aligned and adjacent to one block at the lower bank which is not at end sections of the lower bank;

(5) a fifth building base plate is assembled by five adjacent units; the five units are connected blocks which are divided into two banks; an ripper bank has two blocks and a lower bank has three blocks which are connected side by side and linearly; only one of the block at the upper bank is aligned and adjacent to one block at one end section of the lower bank;

(6) a sixth building base plate is assembled by three adjacent units; the three units are connected blocks which are divided into two banks; an upper bank has two blocks and a lower bank has one block; one of the blocks at the upper bank is aligned and adjacent to the block not at the lower bank;

(7) a seventh building base plate is assembled by five adjacent units; the five units are connected blocks which are divided into three banks; an upper bank has three blocks which are connected side by side and linearly; a middle bank has one block, and a lower bank has one block; the block at the middle bank is aligned and adjacent to one block at an end section of the upper bank; the block at the lower bank is aligned and adjacent to the block at the middle bank;

(8) a eighth building base plate is assembled by five adjacent units; the five units are connected blocks which are divided into three banks; an upper bank has one block; a middle bank has two blocks which are connected side by side, and a lower bank has two blocks which are connected side by side; the block at the middle bank is aligned and adjacent to one block at the upper bank; only one of the blocks at the lower bank is aligned and adjacent to another block at the middle bank;

(9) a ninth building base plate is assembled by five adjacent units; the five units are connected blocks which are divided into two banks; an upper bank has two blocks which are not adjacent to one another and a lower bank has three blocks which are connected side by side and linearly; the blocks at the upper bank are aligned and adjacent to respective blocks at the lower bank;

(10) a tenth building base plate is assembled by four adjacent units; the four units are connected blocks which are divided into two banks; an upper bank has two blocks which are connected side by side and a lower bank has two blocks which are connected side by side; only one block at the upper bank is aligned arid adjacent to one of the blocks at the lower bank;

(11) a eleventh building base plate is assembled by four adjacent units; the four units are connected blocks which are divided into two banks; an upper bank has one block and a lower bank has three blocks which are connected sides by sides and linearly; the block at the upper bank is aligned and adjacent to one blocks at a middle section of the lower bank;

(12) a twelfth building base plate is assembled by five adjacent units; the five units are blocks and are arranged as a cruciform with four blocks being aligned and adjacent to one block at a center section of the cruciform;

(13) a thirteenth building base plate is assembled by six adjacent units; the six units are connected blocks which are divided into three banks; an upper bank has two blocks which are connected side by side; a middle bank has two blocks which are connected side by side, and a lower bank has two blocks which are connected side by side; only one block at the middle bank is aligned and adjacent to one block of the upper bank; only one of the blocks at the lower bank is aligned and adjacent to the block at the middle bank, but not colinear to the block at the upper bank;

(14) a fourteenth building base plate is assembled by six adjacent units; the six units are connected blocks which are divided into two banks; an upper bank has two blocks which are connected side by side and a lower bank has four blocks which are connected side by side and linearly; the blocks at the upper bank are aligned and adjacent to two block not at an end section of the lower bank, respectively;

(15) a Fifteenth building base plate is assembled by six adjacent units; the six units are blocks; five units of the six units are arranged as a cruciform with four blocks being aligned and adjacent to one block at a center section of the cruciform; and the other unit of the six unit are aligned and adjacent to two units;

(16) a sixteenth building base plate is assembled by five adjacent units; the five units are connected blocks which are divided into three banks; an upper bank has one block; a middle bank has two blocks which are connected side by side, and a lower hank has two blocks which are connected side by side; the block at the middle bank is aligned and adjacent to one block of the upper bank; only one of the blocks at the lower hank is aligned and adjacent to the block at the middle bank and is colinear to the block at the upper bank;

(17) a seventh building base plate is assembled by six adjacent units; the seven units are connected blocks which are divided into three banks; an upper bank has one block; a middle bank has two blocks which are connected side by side, and a lower bank has three blocks which are connected side by side and linearly; the block at the middle bank is aligned and adjacent to one block of the upper bank; two of the blocks at the lower bank are aligned and adjacent to the block at the middle bank, and one block at the end section of the lower bank is aligned and adjacent to the block at the upper bank; and

(18) an eigtheenth has only one building base plate;

wherein after the fastening element positions at least one unit to fix the direction, angle and position of the building base plates, the building base plate is used as a center for sequentially placing the other building base plates into the concave slot untill the slot is filled by some selected building base plate;

wherein the fastening element is comprised by two to four short standing posts; the short standing posts insert into the concave groove among the units of the building base plates; a positioning space defined by the short standing posts receives the insertion of at least one unit for limiting the direction, angle and position of the building base plate.

3. The intellectual building base plate assembling game device as claimed in claim 2, wherein the section of the short standing post is in an I, or a cross shape.

4. The intellectual building base plate assembling game device as claimed in claim 2, wherein the fastening element is at least a supporting post; centers of selected units of selected building base plates are formed with respective through holes; after inserting the supporting post into one of the through hole, the supporting post limits the direction, angle and position of the building base plate.

5. The intellectual building base plate assembling game device as claimed in claim 2, wherein the through hole of the unit of the building base plate is in a cross shape while the supporting post is in a T or cross shape.

* * * * *